Dec. 8, 1936.　　　　　J. W. BRYCE　　　　　2,063,482
TABULATING MACHINE
Filed July 26, 1930　　　　3 Sheets-Sheet 2

Inventor
James W. Bryce
By his Attorney
W. M. Wilson

Dec. 8, 1936.    J. W. BRYCE    2,063,482
TABULATING MACHINE
Filed July 26, 1930    3 Sheets-Sheet 3

Inventor
James W. Bryce
By his Attorney
W. M. Wilson

Patented Dec. 8, 1936

2,063,482

UNITED STATES PATENT OFFICE 2,063,482

TABULATING MACHINE

James W. Bryce, Bloomfield, N. J., assignor, by mesne assignments, to International Business Machines Corporation, New York, N. Y., a corporation of New York Application July 26, 1930, Serial No. 470,865

15 Claims. (Cl. 235—92)

This invention relates to accounting and tabulating machines in general and particularly to improvements in methods and apparatus for taking totals.

It is common practice to construct accounting and tabulating machines with tabulating mechanism for feeding, sensing and tabulating records which ordinarily consist of perforated record cards, the perforations constituting index points governing the operation of the machine. It is often desired to secure certain specific data such as a number of totals of all items corresponding to several classifications or groups. As an example, it is frequently desired to tabulate, say the individual sales records of a group of salesmen or a group of sales divisions, in which case the record cards are sorted into groups, each group containing all of the record cards of the individual salesman or sales division. The record cards are then placed in the magazine of the tabulating machine and tabulated in the usual manner.

The tabulating machine as used in practice is equipped with automatic control mechanism which becomes effective to stop the tabulating mechanism when the end of a group of records is reached and automatically initiates a total taking operation which results in the printing of the total of the items in the group. After the total printing operation has been completed the tabulating mechanism is automatically restarted to tabulate the items in the next group of records and when that group ends the machine again automatically takes a total of the items, the process being repeated as long as cards remain in the magazine thus securing a tabulation on the record sheet of the records of individual salesmen or sales divisions. One form of tabulating machine accomplishing the foregoing results is shown and described in Letters Patent No. 1,757,123, granted May 6, 1930 to C. D. Lake and Ralph E. Page and also No. 1,762,145, granted June 10, 1930 to G. F. Daly and Ralph E. Page.

The present invention relates primarily to improvements in the automatic control of the total taking mechanism and has for its principal object to provide a novel and improved arrangement for automatically starting the total taking mechanism whenever the automatic group control functions to stop the tabulating mechanism at the end of a group.

Another object and an important feature of the present invention is a complete separation electrically of the circuits for the tabulating mechanism proper and the total taking mechanism from the circuits for starting the resetting and total taking motor.

The foregoing objects may be accomplished in a number of ways as by providing an arrangement which becomes immediately effective to start the resetting and total taking mechanism whenever the tabulating mechanism stops. One way is to provide a light controlled relay circuit embodying a light sensitive medium such as a photoelectric cell in combination with an amplifying system for increasing the strength of the current passed by the photo-electric cell and delivering it to a relay, closure of the contacts of which starts the driving motor for the total taking mechanism.

Other objects and advantages of the present invention will be pointed out later herein or will be apparent from a study of the folowing specification and claims and the accompanying drawings which illustrate what, for the present at least, may be considered a preferred embodiment of the invention.

In said drawings:

Fig. 3 is a front elevation of a modification in which mechanical means is substituted for the photo-electric means illustrated in Figs. 1 and 2.

Fig. 4 is a side elevation of the modification illustrated in Fig. 3.

The present invention, purely for convenience in description, has been shown as applied to a tabulating machine of the type shown and described in Patent No. 1,762,145 aforesaid, however, it is not limited in its application to the precise machine described therein as it is capable of being used with other machines as well.

Figure 1:
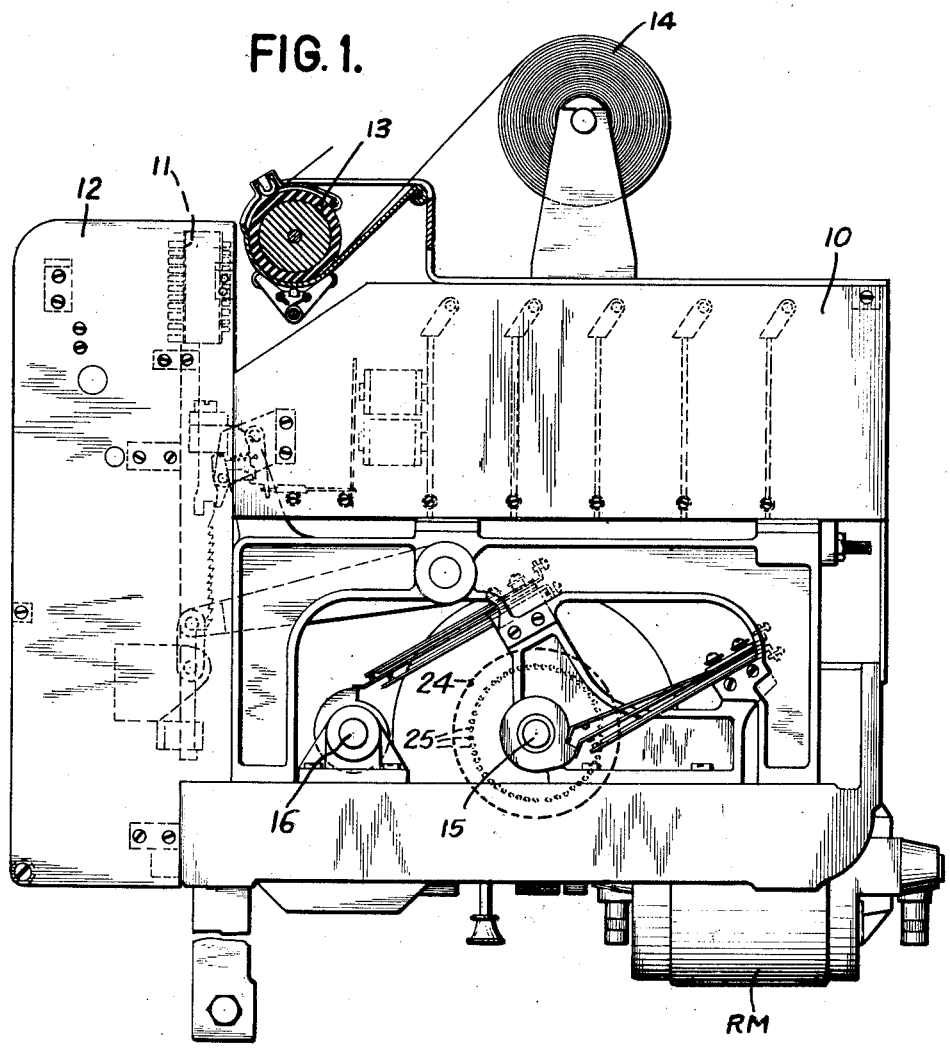
Fig. 1 is a side elevation of a tabulating machine embodying the present invention.

Fig. 1 illustrates the general construction of a portion of the tabulating machine shown in the aforementioned patent, the numeral 10 representing the casing of the machine, RM the resetting or total taking motor, while 11 represents generally the printing mechanism enclosed in a casing 12. The usual printing platen 13 is provided which is adapted to receive the paper web from a supply roll 14 and hold it in printing position. The numeral 15 represents the listing shaft which is part of the tabulating mechanism and driven through suitable gearing by the tabulating machine motor TM (Fig. 2) while 16 represents a shaft driven through a suitable worm gear by the resetting motor RM. The listing shaft 15 makes one revolution per card cycle while the shaft 16 makes one revolution per resetting and total taking cycle. Where the term "tabulating mechanism" is used in the following description and claims it will be understood to mean collectively the usual mechanism driven by motor TM for feeding, sensing and accumulating the items on the perforated records. The terms "total taking mechanism" or "total taking and resetting mechanism" will be understood to refer collectively to the usual mechanism driven by motor RM for reading the totals on the accumulators, printing such totals, and/or clearing the accumulators.

Figure 2:
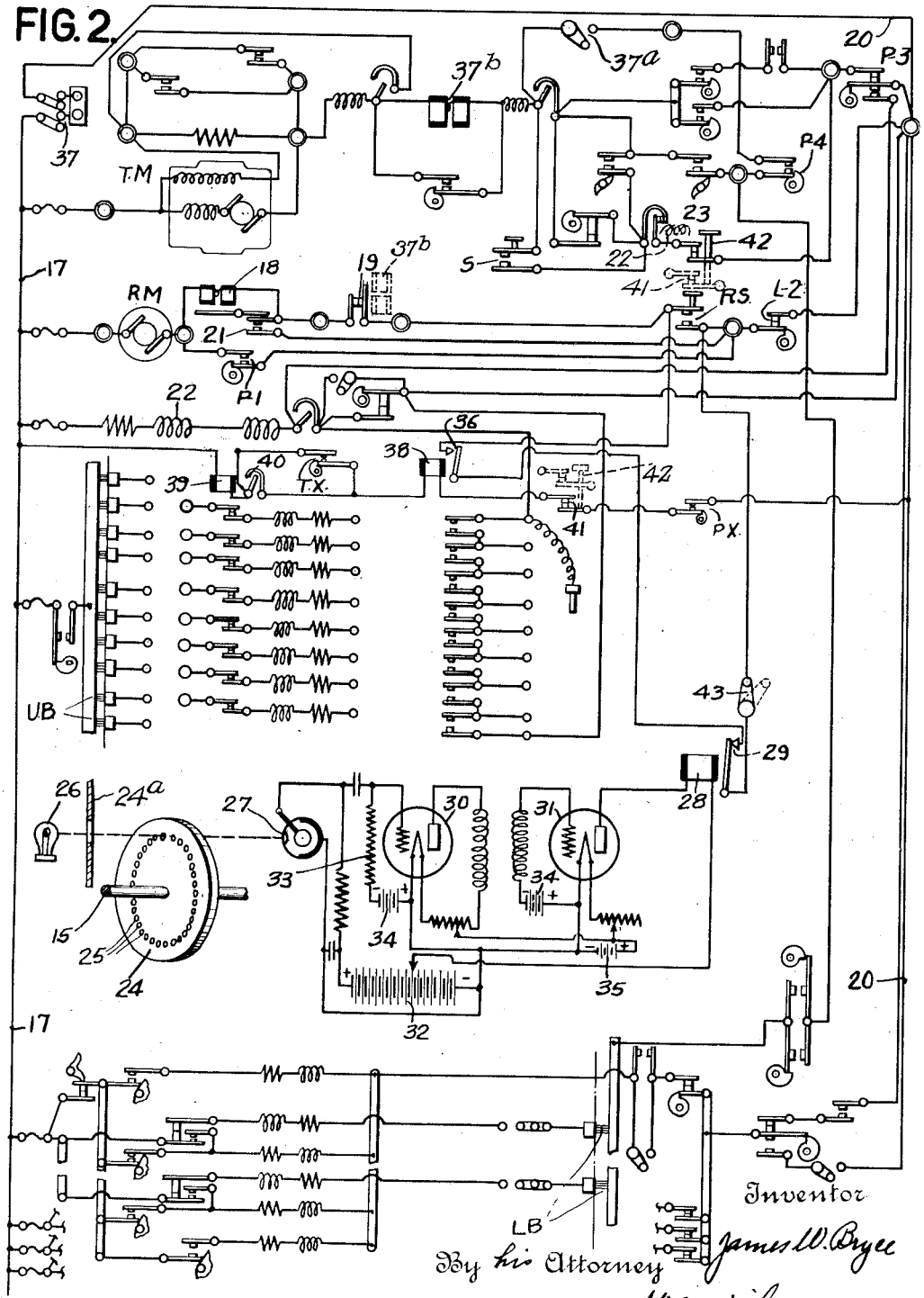
Fig. 2 is a circuit diagram illustrating the relation which the arrangement involved in the present invention bears to the tabulating and total taking circuits.

Fig. 2 illustrates diagrammatically the general arrangement of the circuits for controlling the tabulating motor TM and the resetting motor RM. The tabulating motor drives the tabulating mechanism. It is started in a well known manner by depressing the key S and holding it depressed until cards pass under the lower brushes LB after which holding circuits become effective to maintain the motor in operation as long as cards are passing beneath the brushes or until a change of group occurs.

Similarly, the resetting motor RM drives the total taking and resetting mechanism and may be started by depressing the switch key RS thereby establishing a circuit from the left side of the line 17, through the resetting motor RM, resetting motor clutch magnet 18, contacts 19 (closed when tabulating motor TM is at rest) start key RS, cam contacts L—2 (closed when tabulating motor is at rest) to the right side of the line 20.

Energization of clutch magnet 18 closes contacts 21 thereby maintaining the circuit after the key RS is released. A short time after the resetting motor RM has started cam contacts P—1 close and short circuit the clutch magnet 18 so that re-opening of the contacts P—1 near the end of the resetting and total taking cycle will bring the resetting motor to rest after a single revolution of the total taking shaft 16 has taken place to take the total and reset the counters to zero.

The automatic group control functions exactly as described briefly in Patent No. 1,762,145 and for a complete understanding of its operation reference should be made to that patent. It is sufficient to say herein that a change of group results in deenergizing motor control relay 22 thereby opening contacts 23 and stopping the tabulating motor TM at the end of the last card cycle of the group. This stops the tabulating mechanism.

The present invention contemplates the provision of means for automatically initiating the taking of a total whenever the tabulating mechanism stops and as a direct consequence of such stoppage. One form which such means may take comprises a light controlled circuit adapted to operate a relay for starting the resetting motor and is illustrated in Figs. 1 and 2.

Mounted upon the listing shaft 15 is a disk 24 having a number of holes 25 circumferentially arranged with respect to the shaft, which it will be recalled makes one revolution per card cycle. A source of light such as an incandescent lamp 26 is mounted upon the machine frame adjacent to the holes in the disk 24 while on the opposite side of the disk 24 is a light sensitive medium such as a photo-electric cell 27. Any well known means such as an opaque shield or screen 24a may be provided for the purpose of confining the light emitted by source 26 to a narrow beam capable of passing through the holes 25 in disk 24 into the photo-electric cell 27 to energize the same. The spacing and size of the holes in disk 24 will depend upon the variable conditions encountered in practice, such as the speed of shaft 15, the limiting diameter of the disk 24, and the intensity of the light source. In the present case, it may be assumed that the spacing of the holes is such that when the disk 24 is at rest, either no light will enter the photo-electric cell 27 or a beam of light which is steady in its nature will enter the cell and of a value depending upon the amount of area of a hole 25 which may be partly in alignment with the slit in shield 24a and the window of the photo-electric cell. The essential feature of the construction described above is that the intensity of the beam of light entering the photo-electric cell 27 shall be varying while the disk 24 is in motion and either constant or zero when the disk is at rest.

The photo-electric cell is adapted to control a relay 28 which becomes effective under certain conditions to hold open contacts 29 connected with the starting circuit of resetting motor RM. When the tabulating mechanism is in operation, the listing shaft 15 will be turning rapidly causing the disk 24 to act as a shutter or light chopper thereby producing a rapidly pulsating current in the circuit to the photo-electric cell. As soon as the tabulating motor stops either no light at all will enter the photo-electric cell or the beam of light entering the cell will be steady thereby producing a steady current in the circuit through the cell. Since the variations in current produced by the photo-electric cell owing to variations in the intensity of light entering the cell are too weak to directly control the relay 28, means are provided for amplifying the current to a strength sufficient to control the relay. The amplifier may be of any well-known type, the form shown in the drawing being purely illustrative. The amplifier shown consists of two transformer coupled thermionic valves 30, 31 of the three element type, the first stage valve 30 being capacitively coupled to the photo-electric cell while the output from the second valve is passed through the winding of relay 28. The proper plate voltage is furnished by a battery 32 which also supplies the necessary current for the photo-electric cell 27. A suitable negative grid bias resistance 33 and batteries 34 are provided while a battery 35 furnishes the necessary current used to heat the filaments of the thermionic valves 30, 31.

The contacts 29 are in series with a second pair of relay controlled contacts 36, both pairs of contacts being connected in parallel with the key RS for starting the resetting motor and are provided for the purpose of preventing the resetting motor from being automatically started when the main power switch 37 is closed prior to beginning a series of tabulations, since the relay contacts 29 are always closed when the tabulating motor is not running.

The contacts 36 are closed early in the first card cycle by means of a relay magnet 38 connected in series with cam contacts T—X and P—X and a relay 39. The cam contacts P—X are closed during the entire resetting cycle except for a brief period near the end of the resetting cycle. The cam contacts T—X close momentarily at the beginning of each card cycle thereby establishing a circuit from left side of line 17, relay magnet 39 (closing contacts 40), cam contacts T—X, relay magnet 38 (closing contacts 36); contacts 41 (normally closed) and cam contacts P—X to right side of line 20. Closure of contacts 40 establishes a holding circuit thereby maintaining the circuit after contacts T—X open. The timing of contacts T—X is such that the photo electric cell has time to bring about the opening of contacts 29 before the contacts 36 close so that the resetting motor cannot start except by a manual depression of key RS. The circuit through the relay 38 cannot be broken until a resetting cycle has occurred or until the main switch 37 is opened.

The operation of the arrangement above described is as follows: During the time the tabulating mechanism is in operation the shaft 15 is continually turning with the result that the holes 25 pass in rapid succession between the lamp 26 and photo-electric cell 27 thereby exciting the cell and producing a rapid succession of impulses in the circuit including the photo-electric cell. As a consequence, the variation in potential produced in the circuit of the photo-electric cell will be impressed upon the condenser coupling the grid of the first stage valve 30 to the circuit of the photo-electric cell and a varying current will be likewise produced in the grid circuit of the first stage of the amplifier causing an amplified current to flow in the plate circuit of the first stage which will be further amplified by the second stage and energize the relay 28 thereby holding contacts 29 open.

As soon as the tabulator motor stops the variations in current in the circuit to the photo electric cell will cease and a steady current will flow owing to the light striking the cell becoming steady. It may also happen if the holes 25 are widely spaced, that no light at all will strike the cell when the disk 24 comes to rest. Whichever of these conditions is present no variation in potential will be impressed on the condenser coupling the grid of the first stage valve 30 to the cell circuit and as a consequence a steady direct current will flow in the plate circuit of the first stage valve 30. Owing to the type of coupling used between the two valves 30, 31 no current can flow in the grid circuit of the second stage valve 31 and only a relatively weak steady direct current can flow in the plate circuit of the second stage. As a consequence the current through the relay 28 will be too weak to hold the contacts 29 open and they will close. It is only when a varying current is flowing in the circuit to the photo-electric cell that the current through relay 28 is sufficient to open contacts 29.

The closure of the relay contacts 29 establishes a circuit to the resetting motor through contacts 36 (previously closed when the tabulating motor was started) in the same way as if starting key RS had been depressed manually. Near the end of the resetting and total taking cycle the cam contacts P—1 open and cam contacts P—4 close. If the switch 37a is closed the tabulating motor TM will restart slightly before the resetting motor comes to a complete stop with the result that disk 24 is again put in motion producing rapid variations in the light striking the photoelectric cell 27 and causing the relay 28 to again attract its armature thus opening contacts 29. Before the resetting motor RM comes to a stop the establishment of a circuit to the tabulating motor TM causes the tabulating motor clutch magnet 37b to open contacts 19 and at the same time clutches the card feeding and listing shafts to the tabulating motor.

The cam contacts L—2 open at the beginning of the first card cycle and break the circuit to the resetting motor. The contacts L—2 close for a brief interval of time from near the end of one card cycle to shortly after the beginning of the next cycle but as long as the tabulating motor is in operation contacts 19 and P—1 will be open and even though the relay contacts 29 should fail to open no circuit will be established to the resetting motor RM. The lower cam contacts P—3 close early in the resetting cycle to energize motor control relay magnet 22 to prepare for restarting of the tabulating motor TM and to re-establish the automatic group control circuits for the next card group.

The cam contacts P—X open near the end of the resetting cycle and deenergize relay 38 thereby opening contacts 36 and permitting the cam contacts P—1 to open the circuit to the resetting motor and allow it to come to rest. The cam contacts T—X again become effective to control reclosing of contacts 36 just after the beginning of the first card cycle of the next group to prepare the circuit for automatic starting of the resetting motor when that group comes to an end.

It may be found necessary to stop the tabulating machine as a whole before the end of the card group is reached for some special purpose such as replacing a torn card. If no means were provided to prevent a total taking operation, the resetting motor would start immediately after the stoppage of the tabulating mechanism. The contacts 41 are normally closed but are mechanically connected to the tabulating motor stop key 42 so that the contacts 41 will be opened whenever the key 42 is depressed, thereby breaking the circuit through relay 38 and permitting contacts 36 to open. The resetting motor RM cannot be started automatically as long as contacts 36 are open. Contacts 36 will be reclosed in the manner already described as soon as the tabulating mechanism is restarted.

It may not be desired at times to have the resetting and total taking operations started automatically and for that reason a switch 43 is provided which, when open, prevents automatic starting of the motor RM.

The foregoing described arrangement illustrates one manner in which the contacts 29 may be automatically controlled to initiate a total taking and resetting cycle at the end of a card group. If desired, mechanical means may be provided which is driven or controlled by one of the tabulator shafts such as the listing shaft, one such form being illustrated in Figs. 3 and 4.

Briefly, the mechanism comprises a system of planetary gearing mechanically loaded to control the action of contacts similar to the contacts 29. Loosely mounted upon the shaft 15 is a disk 44 having fastened thereto a ring gear 45 with both internal and external teeth. The external teeth mesh with a gear 46 carries by a short shaft journalled in the main frame of the tabulating machine and carrying a fan 47. It will be clear that the gear 45 will drive the gear 46 and the fan 47 which will provide a slight load or braking force on the gear 45. The internal teeth of gear 45 mesh with the teeth of a gear pinion 48 journalled upon a screw stud 49 carried by an arm 50 loosely mounted upon the shaft 15. A second pinion 51, pinned or otherwise fastened to the shaft 15, meshes with the pinion 48 so that rotation of the shaft 15 in the direction of the solid arrow in Fig. 3 will cause the ring gear 45 to turn in the direction of the broken arrow. Suitable collars 52 fastened on the shaft 15 prevent the disk 44, pinion 51 and arm 50 from shifting out of their proper alignment.

A spring 53 tends to hold the free end of arm 50 against an adjustable stop 54 carried by the machine frame while a fixed stop 55 permits a slight amount of rocking movement of the arm 50 about the shaft 15 as an axis. When the tabulating motor is not running the arm 50 is held by the spring 53 against the stop 54 in which position a pair of insulated contacts 56 are kept closed by the pressure of an insulated block 57 attached to the arm 50. The stops 54 and 55 are spaced a sufficient distance to permit the arm 50 to move far enough to the right, Fig. 3, to open the contacts 56.

The contacts 56 correspond to the contacts 29 shown in Fig. 2 and are designed to accomplish the same results. With this understanding in mind and considering the mechanism just described in connection with Figs. 3 and 4 as having replaced the arrangement including the photoelectric cell relay magnet 28 and the light chopper shown in Fig. 2, the operation will now be made clear.

As soon as the tabulating motor is started and the listing shaft 15 begins to turn, the pinion 51 will drive pinion 48 and ring gear 45 thereby driving the fan 47. The combined effect of the inertia, friction and air resistance of the fan will momentarily exert a braking force upon the ring gear with the result that the ring gear 45 will be prevented from turning immediately and will remain fixed for an instant. The pinion 48 will act like a lever of the second class in which the fulcrum is on the gear 45, the load at the screw stud 49 and the power applied to a point in the pinion 48 opposite to the fulcrum point on gear 45. As a consequence the force applied to the arm 50 and toward the right, Fig. 3, will rock the arm 50 a slight amount clockwise against the tension of spring 53, bringing the arm in contact with stop 55 and resulting in the opening of contacts 56. After the shaft 15 reaches full speed the air friction on the fan 47 will be sufficient to retard the gear 45 an amount sufficient to hold the arm 50 in contact with the stop 55 and maintain the contacts 56 in open position.

The instant the shaft 15 changes its condition of motion as by materially reducing its speed or stopping the fan 47 will lose speed and the spring 53 will quickly overcome the now relatively slight clockwise force upon the arm 50 and as a consequence the arm will be pulled back against the stop 54, assisted to a certain extent by the inertia of the fan which will tend somewhat to continue turning the gear 45 and exert a slight force in the same direction as the driving force applied to the fan when the shaft 15 was turning. It will be noted that due to the limited amount of movement of arm 50 which is permitted by stops 54, 55, the fan 47 and disk 44, due to their inertia while in motion, will tend to continue turning for the brief period of time when the arm 50 is moving from a position against stop 55 to a position against stop 54, and this movement of the arm, which is due to the influence of spring 53, will be assisted by the inertia of both the fan and the disk. The fan 47 and disk 44 will come to rest when the arm 50 strikes stop 54.

The cam contacts T—X are necessarily timed to close a sufficient length of time after the beginning of the first card cycle to permit the contacts 56 (which replace contacts 29) to close. It is necessary that the spring 53 have sufficient tension to overcome the friction of the fan 47 when the latter is at rest and the friction of the arm 50 upon shaft 15. By turning an adjusting screw 58 the tension of the spring 53 may be regulated to the value necessary to produce proper functioning of the parts.

No attempt has been made in the foregoing description to include a description of the tabulating mechanism and the total taking and resetting mechanism as these mechanisms are now all well-known in the art and fully explained in the cited patents. Only portions of the circuits for the above mechanisms have been shown in the drawings as a detailed illustration and description would be unnecessary duplication and not called for in view of the state of the art.

One of the most important features of the present invention is the electrical separation of the circuit for controlling and operating the resetting and total taking motor RM from the circuits for controlling and operating the tabulating motor TM, the totaling, printing and accumulating mechanism, and the group control circuits. The only electrical connection between the circuit for the resetting motor and the other circuits is the purely optional and incidental connection of all circuits to a single source of power.

The present invention permits the connection of the total taking and resetting motor to a separate source of power thus securing absolutely complete electrical independence. This feature permits the use of direct current for operating the accounting and tabulating machine proper and its control circuits and alternating current for operating the total taking and resetting motor.

When a motor generator must be used to supply direct current for operating the tabulating machine this feature makes it possible to increase the number of accounting and tabulating machines operated from a given motor generator by connecting all of the resetting motor circuits to the alternating current line supplying the motor generator or to an entirely separate source of power, as circumstances may dictate, this change involving a no more expensive outlay than a replacement of the direct current resetting and total taking motors on the existing machines with alternating current motors which would be frequently a cheaper procedure than installing a complete new motor generator for the new machines. In new installations the present invention reduces the cost of the installation where the main power source is alternating current, by reducing the size and consequently the cost of the motor generator required.

The present invention has been shown and described with reference to a specific form of embodiment and applied to a particular type of tabulating and accounting machine, however, it is understood that it is not limited to the precise form shown as it may be modified in details or applied to other types of accounting machines as well in order to suitably adapt it to the varying conditions met in practice, all such modifications and adaptations falling within the scope of the following claims:

What is claimed is:

1. In a machine of the class described having tabulating mechanism and total taking mechanism, the combination of an element driven by said tabulating mechanism and light sensitive means controlled by said element for initiating a total taking operation of the total taking mechanism automatically whenever said tabulating mechanism completes a series of tabulations.

2. In combination, tabulating mechanism including accumulating mechanism, mechanism for taking a total from the accumulating mechanism under control of the latter, record controlled means for interrupting the operation of the tabulating mechanism and thereby cause cessation of motion of the latter after a group of records has been tabulated, and means to sense the cessation of motion of the tabulating mechanism for automatically initiating a total taking cycle by the total taking mechanism.

3. In combination, tabulating mechanism including accumulating devices, means normally tending to take a total from the accumulating devices under control of the latter, and means sensitive to motion of the tabulating mechanism while the latter is in operation for preventing the total taking means from taking a total while the tabulating mechanism is in operation.

4. In a machine of the class described, the combination of mechanism for tabulating records arranged in groups, mechanism for stopping the tabulating mechanism at the end of each group, total taking mechanism controllable by said tabulating mechanism, driving means for the total taking means, means for connecting the driving means to the total taking means to drive the latter, a light sensitive device for calling the connecting means into action, and means operated by the tabulating mechanism for variably affecting the light sensitive device in accordance with a change in operation of the tabulating mechanism.

5. In a machine of the class described, the combination with tabulating mechanism including accumulating mechanism, means for taking a total under control of the accumulating mechanism, including a driving motor, an element actuated by the tabulating mechanism, and a light responsive device for sensing movement of said element and operative to control the first named means in accordance with movement of the tabulating mechanism.

6. In a machine of the class described, the combination of tabulating mechanism including accumulating devices, means for taking a total from and under control of the accumulating devices including a driving motor, a source of light, a light sensitive cell, means operated by the tabulating mechanism when in motion for controlling the effect of light from said source on said cell, and means controlled by said cell for initiating operation of the driving motor.

7. In an accounting machine of the class described, mechanism for tabulating accounting and statistical data under control of perforated records bearing such data, automatic means controlled by said records for interrupting operation of said mechanism, total taking mechanism for recording totals of the data tabulated, means rotatably connected to the tabulating mechanism for distinguishing whether the tabulating mechanism is at rest or in motion, and means controlled by the last named means for initiating an operation of the total taking mechanism.

8. In a machine of the class described, tabulating mechanism, total taking mechanism, a motion sensing device operated by the tabulating mechanism, including an element rotated by movement of the tabulating mechanism and a circuit controlling device operated by motion of said element, and means controlled by the circuit controlling device for initiating operation of the total taking mechanism when motion of said element ceases in response to an interruption of the operation of the tabulating mechanism.

9. In a machine of the class described, accumulating mechanism, means to operate the accumulating mechanism, total taking mechanism operable to take a total from the accumulating mechanism, a light sensitive device for controlling the operation of the total taking mechanism, and means actuated by the operating means for controlling the action of light on the light sensitive device.

10. In combination, tabulating mechanism including accumulating mechanism, means to take a total from the accumulating mechanism, means to detect motion of the tabulating mechanism including an element driven by the tabulating mechanism and a device responsive to a relatively slight movement of said element, and means controlled by said device for causing operation of the total taking means.

11. In a machine of the class described, the combination of tabulating mechanism including accumulating mechanism, total taking mechanism for taking a total from the accumulating mechanism, a light sensitive medium, a source of light co-operating with the light sensitive medium, means connected to the tabulating mechanism whereby movement of said tabulating mechanism causes variations in the light emitted from said source and striking said medium, and means controlled by the light sensitive medium for initiating operation of the total taking mechanism.

12. In a machine of the class described, tabulating mechanism, total taking mechanism, and means for sensing motion of the tabulating mechanism and operative to initiate operation of the total taking mechanism upon cessation of motion of the tabulating mechanism.

13. In combination, tabulating mechanism including accumulating mechanism, mechanism for taking a total from the accumulating mechanism under control of the latter, record controlled means for interrupting the operation of the tabulating mechanism and thereby cause cessation of motion of the latter after a group of records has been tabulated; and means to sense the cessation of motion of the tabulating mechanism for automatically initiating a total taking cycle by the total taking mechanism, said means comprising a gear driven by the tabulating mechanism, a gear concentric with the first gear, a pivoted arm, a pinion pivotally mounted on said arm and meshing with both of said gears, a fixed stop engaging said arm, yielding means to hold said arm against said stop, means to retard movement of said second gear when said first gear rotates and having the effect of causing said arm to become displaced away from said stop, and means actuated by said arm in its movement to control operation of the total taking means.

14. In a machine of the class described, tabulating mechanism, total taking mechanism; a planetary gear device including a sun gear rotated when the tabulating mechanism is in operation, a planet gear engaging the sun gear, a ring gear engaging the planet gear so as to be rotated when the sun gear rotates, a movable support for the planet gear, and means to retard rotation of the ring gear whereby said planet gear tends to move in its orbit and thereby move said movable support; and means controlled by the movable support for controlling the total taking means.

15. In a machine of the class described, tabulating mechanism, total taking mechanism; a planetary gear device responsive to movement of the tabulating mechanism, and means controlled by the gear device for initiating operation of the total taking mechanism upon cessation of movement of the tabulating mechanism.

JAMES W. BRYCE.